(12) United States Patent
Miyago et al.

(10) Patent No.: US 11,344,982 B2
(45) Date of Patent: May 31, 2022

(54) SCREW FASTENING DEVICE AND SCREW FASTENING METHOD

(71) Applicants: SUBARU CORPORATION, Tokyo (JP); SANYO MACHINE WORKS, LTD., Aichi (JP)

(72) Inventors: Masazumi Miyago, Tokyo (JP); Hisashi Ryota, Aichi (JP); Kohtaro Urata, Aichi (JP)

(73) Assignees: SUBARU CORPORATION, Tokyo (JP); SANYO MACHINE WORKS, LTD., Tokyo (JP)

( * ) Notice: Subject to any disclaimer, the term of this patent is extended or adjusted under 35 U.S.C. 154(b) by 320 days.

(21) Appl. No.: 16/656,989

(22) Filed: Oct. 18, 2019

(65) Prior Publication Data

US 2020/0122279 A1    Apr. 23, 2020

(30) Foreign Application Priority Data

Oct. 22, 2018   (JP) .............................. JP2018-198482

(51) Int. Cl.
  *B23P 19/06*   (2006.01)
  *G01L 5/24*    (2006.01)

(52) U.S. Cl.
  CPC .............. *B23P 19/065* (2013.01); *G01L 5/24* (2013.01); *B23P 19/067* (2013.01); *B23P 2700/50* (2013.01)

(58) Field of Classification Search
  CPC ........ G01L 5/24; B23P 19/065; B23P 19/067; Y10T 29/49766; Y10T 29/49767; Y10T 29/49769; B25B 23/14; B25B 23/1456; B25B 23/147; B25B 27/00; B25B 27/062; B25B 28/00
  See application file for complete search history.

(56) References Cited

U.S. PATENT DOCUMENTS 3,851,386 A  * 12/1974  Ellzey, Jr. ............... F16B 31/02
                                                    29/407.03
4,088,197 A  *  5/1978  Roll ...................... B25B 23/145
                                                    173/178

(Continued)

FOREIGN PATENT DOCUMENTS

JP        S62-102978         5/1987

*Primary Examiner* — Sarang Afzali
(74) *Attorney, Agent, or Firm* — Smith, Gambrell & Russell, LLP

(57) ABSTRACT

A screw fastening apparatus for fastening a screw member having a bearing surface with respect to a member to be fastened by rotating the screw member from a theoretical seating point to a target rotational angle, including a rotational angle sensor which senses rotational angle values of the screw member for fastening the screw member, a torque detector which detects torque values for fastening the screw member, a torque value difference detector which detects a plurality of torque value differences, each of the torque value differences is a difference of the torque values detected at intervals of a constant rotational angle, a slip detector which detects a slip of the screw member with respect to the member to be fastened, from an average of the torque value differences, and a screw fastening discontinuing unit which instructs to discontinue the screw fastening when the slip is detected by the slip detector.

17 Claims, 10 Drawing Sheets

(56) References Cited

U.S. PATENT DOCUMENTS

| | | | |
|---|---|---|---|
| 4,106,176 A | | 8/1978 | Rice et al. |
| 5,117,919 A | * | 6/1992 | Borries ............... B25B 23/1456 |
| | | | 173/1 |
| 9,308,632 B2 | * | 4/2016 | Junkers ................... B25B 21/00 |
| 10,383,674 B2 | * | 8/2019 | Sexson .............. A61B 17/1626 |
| 2003/0065456 A1 | * | 4/2003 | McGee .................. B25B 23/14 |
| | | | 702/41 |
| 2006/0009924 A1 | * | 1/2006 | McGee .................. B25B 23/14 |
| | | | 702/41 |
| 2009/0078057 A1 | * | 3/2009 | Schultz .............. B25B 23/1425 |
| | | | 73/862.23 |
| 2012/0090864 A1 | * | 4/2012 | Junkers ................ B25B 21/002 |
| | | | 173/218 |
| 2018/0165978 A1 | * | 6/2018 | Wood ..................... G10L 15/22 |
| 2021/0187783 A1 | * | 6/2021 | Bellissimo ........... B27M 3/0013 |

* cited by examiner

SCREW FASTENING DEVICE AND SCREW FASTENING METHOD

CROSS-REFERENCE TO RELATED APPLICATIONS

The present application claims priority from Japanese Patent Application No. 2018-198482 filed on Oct. 22, 2018, the entire contents of which are hereby incorporated by reference.

BACKGROUND

(1) Technical Field

The technology relates to a screw fastening apparatus and a screw fastening method.

(2) Description of Related Art

In recent years, there is a demand, for instance, for downsizing vehicles in automobile manufactures. Following the downsizing, various parts of the vehicles tend to be smaller or thinner. When such vehicle parts are fastened with a screw member such as a bolt or a nut, it is helpful to control an axial tension to be generated on the bolt member, in addition to a fastening torque control. In other words, it is possible to control a stress to be applied to a member to be fastened, by controlling the axial tension of the screw member to fasten.

The axial tension is a tension force acting in an axial member such as a bolt, which is to be proportional to a rotational angle in the course of fastening a screw member, from a contact (hereinafter, referred to as "seating") of the bearing surface of a screw member such as a nut or a bolt head with a member to be fastened.

Fastening a screw member is often carried out in accordance with a torque angle method, wherein the fastening is carried out by rotating the screw member for a predetermined rotational angle, that is from the generation/detection of a predetermined torque (value) called "snug torque (value)" to the completion of the fastening. Here, the snug torque is a predetermined value to be observed following the seating of the bearing surface of the bolt member, on or above which it is usually considered that the screw member is seated on the member to be fastened. In the torque angle method, a rotational angle of the screw member defined between the seating of the screw member and the detection of snug torque remains unclear.

This is because the seating of the screw member would not be accurately detected, only by monitoring the torque for fastening the screw member. In addition to the above, the rotational angle, from the seating of the screw member to the detection of snug torque value varies, depending on the friction coefficient of the member to be fastened.

On the other hand, Japanese Unexamined Patent Application Publication (JP-A) No. 62 (1987)-102978 describes a screw fastening method, by that it possible to determine the seating of the screw member. According to this method, it is possible to control the rotational angle of the screw member to be a target rotational angle. Consequently, the axial tension of the screw member can be improved. This method is called torque tension method, wherein a screw member is fastened for a predetermined rotational angle which defined as a rotational angle between a theoretical seating point and a target rotational angle. More specifically, in the torque tension method, a screw member is fastened for a predetermined rotational angle ($\Phi 0$) (i.e., unit rotational angle) after the detection of the snug torque value (ST). The above-mentioned theoretical seating point of the screw member is obtained by subtracting the snug torque value (ST) from a certain torque value (T1) to give a torque difference ($\Delta T1$), and obtaining a torque increased ratio (i.e. gradient of the torque—rotational angle curve) by dividing the torque difference ($\Delta T1$) with the unit rotational angle ($\phi 0$). Thus, the theoretical seating point is obtained from the torque increased ratio, and a torque value such as the snug torque value (ST). Accordingly, it is made possible to determine a rotational angle from the theoretical seating point to the snug torque generation.

In a torque value obtained in an actual measurement by use of a torque detector such as a torque transducer may accompany noise, which is large or small depending upon the contact state of the bearing surface of a screw member with respect to a member to be fastened. Further, it is possible to have a so-called stick-slip (hereinafter, referred to as "slip") which can be observed in the course of the screw fastening, at the junction of the bearing surface of the screw member with the member to be fastened. Such slip may be observed as fluctuation of torque values (small noise-affected torque value variation/difference). The slip of the screw member is observed on a very rare occasion, which however is difficult to predict when to occur. In the case where the torque value is used as the basis for the above-discussed calculation of the torque increase ratio in the torque tension method, the resultant the torque increase ratio would be different from the actual torque increase ratio. In other words, the thus obtained theoretical seating point may not be accurate enough to improve the axial tension accuracy. Since the occurrence of slip in the course of the screw fastening is very rare, it is possible to suspend/stop the screw fastening operation when the slip is observed.

For detecting a slip, torque values are measured for every predetermined rotational angle of the screw member. Then, it is possible to consider that a slip has occurred when a detected torque value deviates from a threshold value. However, a torque value can be increased beyond the threshold value depending on the noise level added thereto.

In other words, a torque value fluctuation may also be erroneously determined as a slip even when the torque value exceeds the threshold because of the noise inclusion. If the torque value exceeding the threshold value is erroneously evaluated as a slip and the fastening operation is suspended not because of a slip but because of a noise, the operational productivity may be affected.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
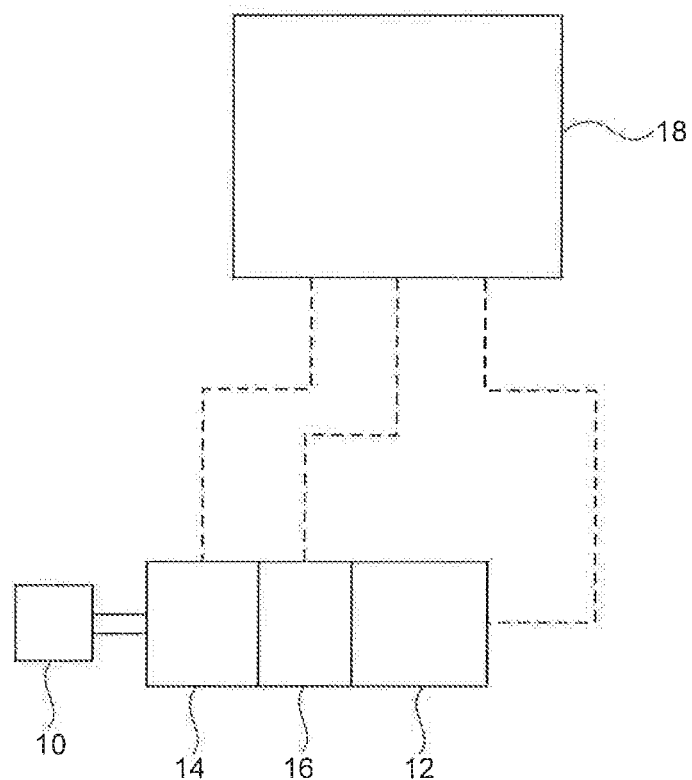
FIG. 1 is a block diagram of at least one embodiment of a screw fastening apparatus.

In the following, some embodiments of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

A screw fastening apparatus is disclosed which is for fastening a screw member having a bearing surface with respect to a member to be fastened by rotating the screw member from a theoretical seating point to a target rotational angle. The screw fastening apparatus comprises a rotational angle sensor which senses rotational angle values of the screw member for fastening the screw member, a torque detector which detects torque values for fastening the screw member. Herein, the theoretical seating point can be obtained by extrapolating a torque increased ratio, which is a quotient obtained by dividing a torque value difference between the first torque value and the second torque by a predetermined unit rotational angle. This can be The screw fastening apparatus further comprises a torque value difference detector which detects a plurality of torque value differences, each of the torque value differences is a difference of the torque values detected at intervals of a constant rotational angle; a slip detector which detects a slip of the screw member with respect to the member to be fastened, from an average of the torque value differences; and a screw fastening discontinuing unit which instructs to discontinue the screw fastening when the slip is detected by the slip detector.

The slip detector may comprise a moving average calculation unit which calculates a moving average value of the plurality of torque value differences, and a slip determination unit which determines that a slip of the screw member has occurred, when the moving average value calculated by the moving average calculation unit is on or below a predetermined threshold value.

The slip detector may determine that a slip of the screw member has occurred, after the torque value differences, which are successively detected by the torque value difference detector, are continuously lowered.

The screw fastening apparatus as claimed in Claim 2, wherein the slip determination unit determines that a slip of the screw member has occurred, after the torque value differences, which are successively detected by the torque value difference detector, are continuously lowered.

The screw fastening apparatus may further comprise a control unit which comprises therein the torque value difference detector, the slip detector, and the screw fastening discontinuing unit. The control unit may further comprise a central processing unit (CPU) and a memory unit connected to the central processing unit, the memory stores the torque values detected by the torque detector, and outputs the torque values to the torque value difference detector. The calculation for obtaining the seating point can be made also by the control unit.

The number of the plurality of torque value differences used for obtaining the average by the slip detector or the moving average by the moving average calculation unit is variable. For example, 5 to 10 torque value differences can be used as samples for average calculation.

A screw fastening method is also disclosed which is for fastening a screw member having a bearing surface with respect to a member to be fastened by rotating the screw member from a theoretical seating point to a target rotational angle. The screw fastening method comprises sensing rotational angle values of the screw member for fastening the screw member by a rotational angle sensor; detecting torque values for fastening the screw member by a torque detector, and obtaining the theoretical seating point being obtained by extrapolating a torque increased ratio, which is a quotient obtained by dividing a torque value difference between the first torque value and the second torque by a predetermined unit rotational angle. The screw fastening method further comprises detecting a plurality of torque value differences by a torque value difference detector, each of the torque value differences is a difference of the torque values detected at intervals of a constant rotational angle, detecting a slip of the screw member with respect to the member to be fastened by a slip detector, from an average of the torque value differences, and instructing to discontinue the screw fastening by a screw fastening discontinuing unit when the slip is detected by the slip detector.

At least one embodiment of the screw fastening apparatus or screw fastening method will be explained with referring to figures. FIG. 1 is a schematic block diagram for illustrating a screw fastening apparatus, which can be used for a vehicle engine assembly. Structural parts of the screw fastening apparatus themselves may be the same or almost the same with those of known screw fastening apparatus. The screw fastening apparatus comprises a socket 10 which fits into a screw member such as a head of a bolt member or a nut member; an electric motor 12 which rotates the socket 10; a torque detector 14 such as a torque transducer which detects a fastening torque of the screw member driven by the electric motor 12; a rotational angle sensor 16 which detects a rotational angle of the screw member. The electric motor 12 is driven by a control unit 18. The fastening torque detected with by the torque detector 14 and the rotational angle detected by the rotational angle sensor 16 are read by the control unit 18.

The screw fastening apparatus further comprises a torque value difference detector 18a, for detecting torque differences based on torque values detected by the torque detector 14; a slip detector 18b which detects a slip of the screw member with respect to the member to be fastened; and a screw fastening discontinuing unit 18c which instructs to discontinue the screw fastening, e.g. to a mechanical part such as a ratchet or clutch and/or an electrical part such as an electrical circuit for supplying electricity to the motor. After receiving the instructions, the mechanical part will stop the screw fastening operation, and the electrical part will stop the electricity supply, thereby suspending the screw fastening operation.

The torque value difference detector 18a, the slip detector 18b, and the screw fastening discontinuing unit 18c may be in the control unit 18. Alternatively, each of the torque value difference detector 18a, the slip detector 18b, and the screw fastening discontinuing unit 18c, or two of them may be in a separate control unit.

The control unit 18 is equipped with a computer system (not shown) such as a microprocessor. The computer system may comprise a central processing unit (CPU) with a high processing performance, a memory unit, for instance for storing a program, and an input/output unit(s) for reading a sensor signal or executing a mutual communication with other control apparatus. An example of a computer system used in the automotive industry is a programmable logic controller.

Figure 8:
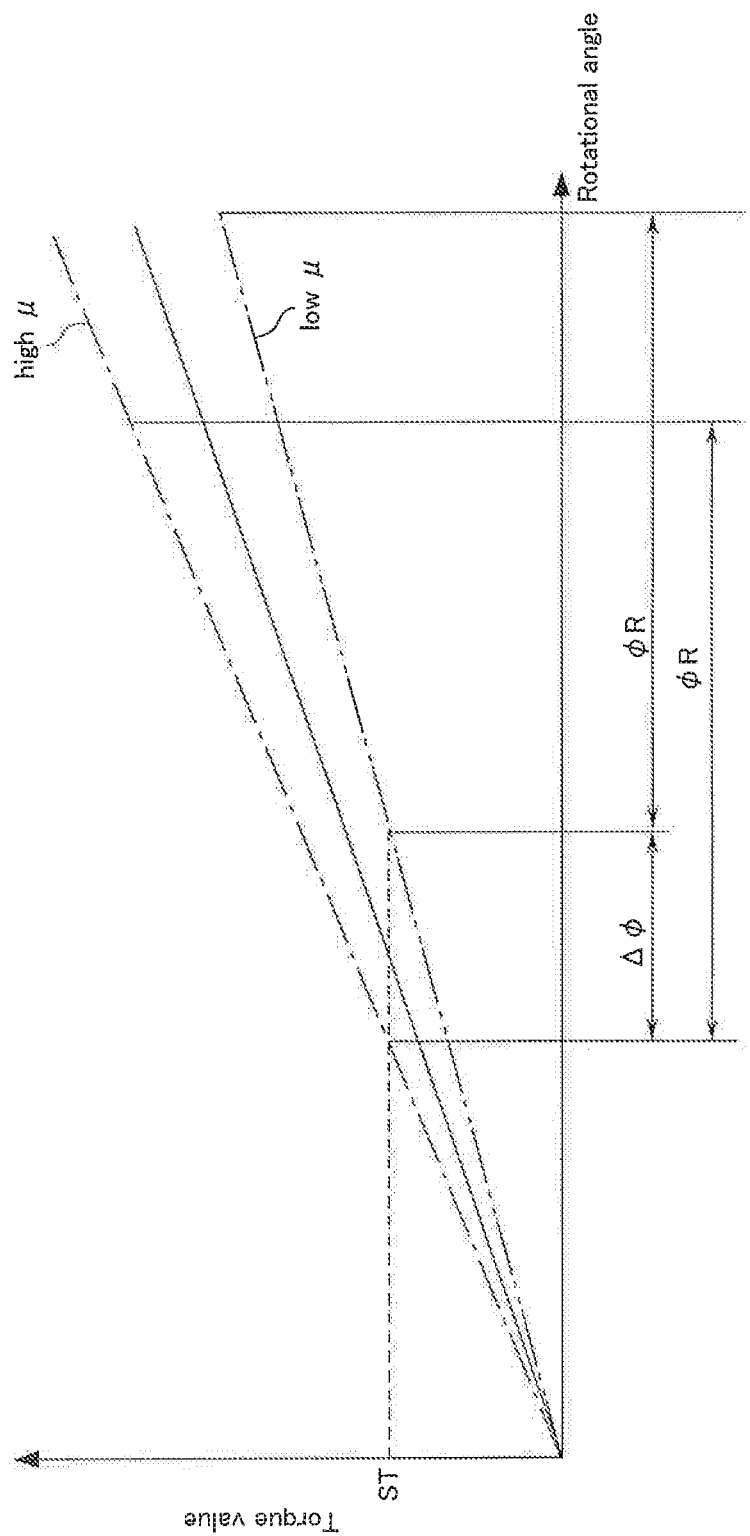
FIG. 8 is an explanatory diagram for illustrating a screw fastening method.

Prior to the explanation regarding a screw fastening apparatus and a screw fastening method as at least one embodiment of the technology, a screw fastening in accordance with the above-mentioned torque angle method will be explained by referring to FIG. 8. In the torque angle method, a screw fastening is carried out by rotating a screw member for a predetermined rotational angle $\varphi 0$ from the point where a detected fastening torque value reaches a predetermined snug torque value, which is observed after the screw member is seated on a member to be fastened. The detected torque value is supposed to have generated from the point when the screw member is seated on the member to be fastened. In FIG. 8, the solid line is an example for describing a fastening torque—rotational angle property curve, representing an averaged curve (composed of mean values). The fastening torque—rotational angle property curve may vary, affected by a frictional coefficient of the screw member with respect to the member to be fastened. The junction between the screw member and the member to be fastened will also be described as a seating junction. Here, the friction coefficient of screw threads will also affect the fastening torque—rotational angle property.

An alternate long and short dash line in FIG. 8 describes, as an example, an instance where the seating junction has a high friction coefficient (denoted as high $\mu$ in FIG. 8). In this case, the rotational angle of the screw member from the seating of the screw member to the generation of snag torque (i.e., point where the predetermined snug torque value is detected) is small. On the other hand, where the friction coefficient of the seating junction is small (denoted as low $\mu$ in FIG. 8) as described with an alternate long and two short dashes line in the figure, the rotational angle of the screw member from the seating of the screw member to the generation of the snug torque is large. As discussed previously, torque values to be an actually detected will not be as simple as the straight line or curve in the drawing figure, but accompany small noises. Further, the curve will often have distorted wave form at the seating of the screw member to the member to be fastened. Therefore, it is difficult to determine the seating point of the screw member. For example, the rotational angles at the snug torque value (ST) in the two separate screw fastening procedures, i.e., one with a large friction coefficient (high $\mu$), and another with a small friction coefficient (small $\mu$), will be different from each other by a rotational angle $\Delta\varphi$. The rotational angle $\Delta\varphi$ is observed, in turn, at an arbitral rotational angle $\varphi R$ which may be at a target rotational angle. Since the axial tension of the screw member varies depending on the rotational angle, the rotational angle difference $\Delta\varphi$ in the two screw fastening procedures would result in different axial tensions.

Figure 2A:
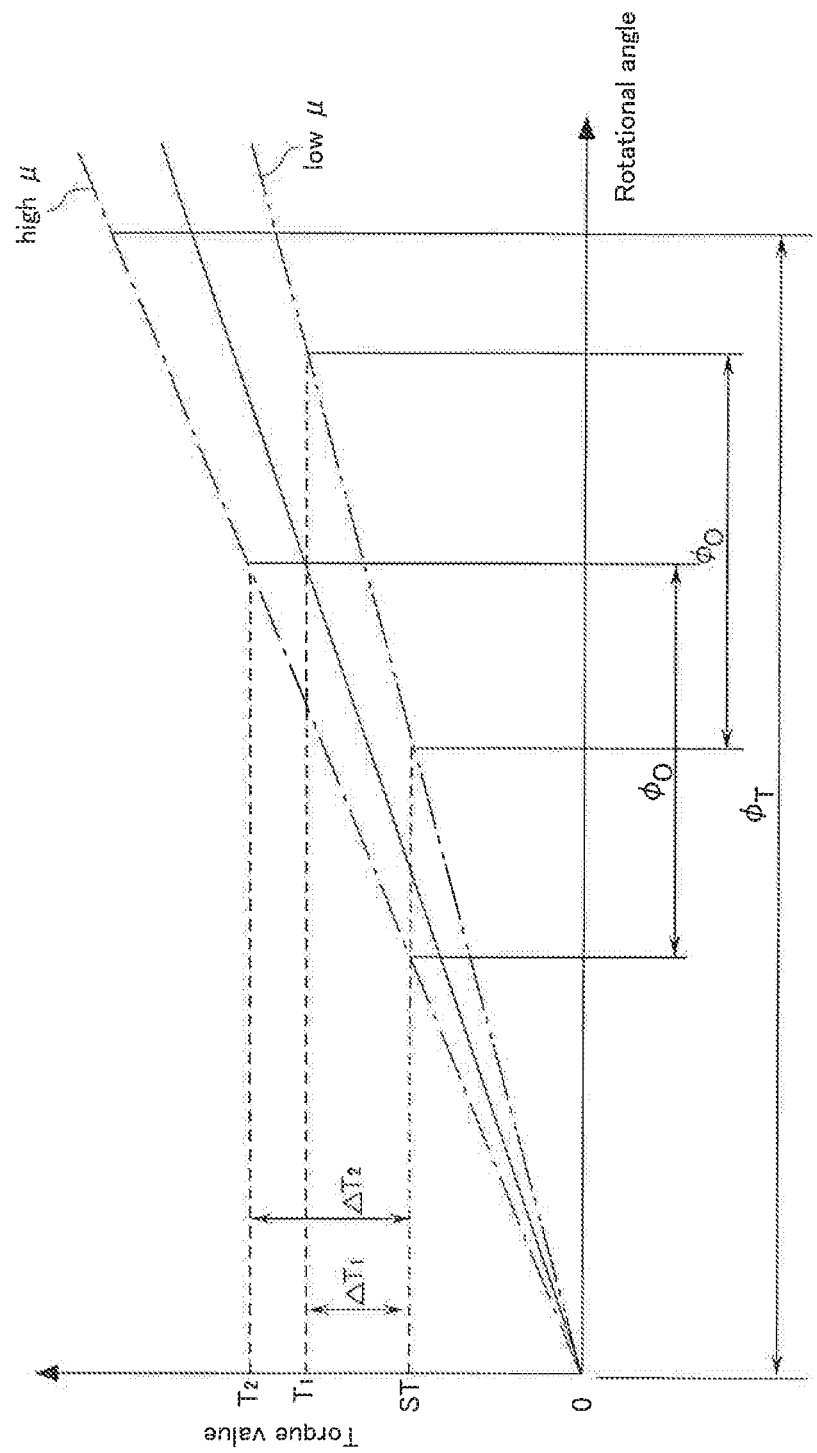
FIGS. 2A and 2B are explanatory diagrams for illustrating a screw fastening method by use of the screw fastening apparatus explained with FIG. 1, FIGS. 3A and 2B are explanatory diagrams for illustrating a screw fastening procedure where a slip is detected in the screw fastening method explained with FIG. 1.

FIG. 2A is an explanatory diagram for illustrating the basic principle of the screw fastening method, in particular in accordance with the previously mentioned torque tension method, by use of a screw fastening apparatus as at least one embodiment. Under the torque tension method, the screw fastening is carried out by rotating a screw member for the rotational angle $\varphi 0$ after the snug torque value is detected, following the seating of the screw member on the member to be fastened. Herein, the rotational angle $\varphi 0$ is used as a unit rotational angle. The snug torque value is subtracted from the torque value (T1 or T2) at the respective rotational angle $\varphi 0$ to give a torque difference ($\Delta T1$ or $\Delta T2$). It is possible to determine a torque increase ratio by dividing the torque difference ($\Delta T1$ or $\Delta T2$) with the unit rotational angle $\varphi 0$. As can be seen from the figure, the torque values (T1 and T2) at the respective unit rotational angle $\varphi 0$, i.e., the torque values reached after rotating the screw member for the rotational angle $\varphi 0$ from the snug torque generation point vary, depending on the friction coefficient of the seating junction, i.e., whether the friction coefficient is large or small. In this way, the torque increase ratio is obtained with the friction coefficient being reflected therein, and hence large and small gradients are given, respectively, for large and small friction coefficients.

Through extrapolation of the fastening torque—rotational angle property curve with the torque increase ratio, an intercept with ordinate, where torque value of 0 (zero) would be obtained. The intercept is applicable as a theoretical seating point. By use of the thus obtained theoretical seating point and the snug torque value, a rotational angle of the screw member, which is from the seating point to the snug torque generation point can be graphically determined. Alternatively, the rotational angle of the screw member from the seating of the screw member to the predetermined snug torque point can be directly determined by dividing the snug torque with the torque increase ratio. The above mentioned calculation for obtaining the theoretical seating point may be carried out by a control unit in or outside the screw fastening apparatus.

Figure 2B:
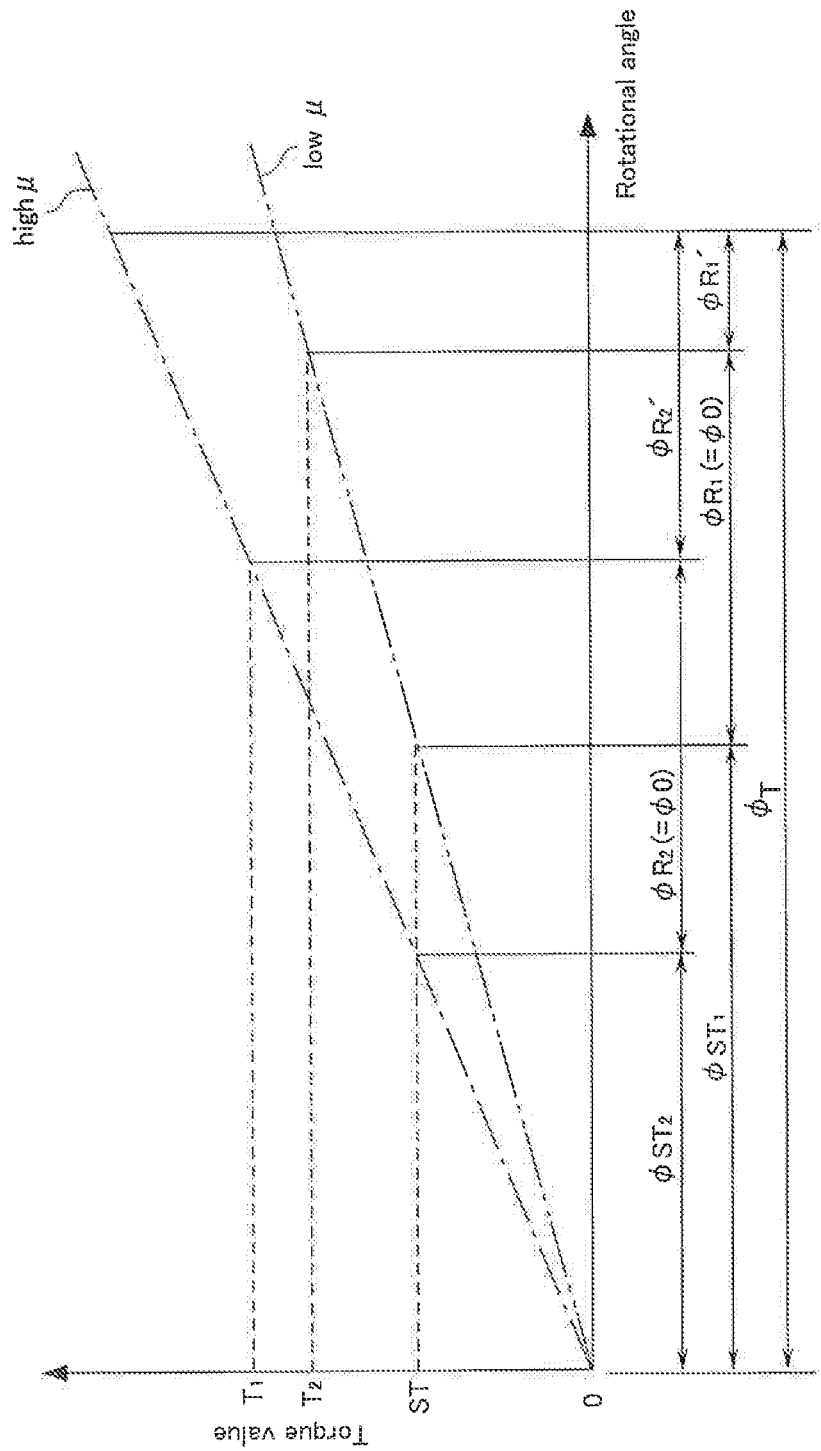

FIG. 2B is a diagram for explaining an axial tension of a screw member by illustrating the relationship between the rotational angle and torque force. The axial tension of the screw member can be prescribed with a predetermined rotational angle $\varphi T$ (target rotational angle) defined between the seating of the screw member and the completion of the fastening operation. To complete the screw fastening ($\varphi T$), it is necessary to fasten the screw member for a further rotational angle ($\varphi R1'$ or $\varphi R2'$; $\varphi R1' \neq \varphi R2'$), in addition to the rotational angle till the snug torque value (ST1 or ST2) and the current rotational angle ($\varphi R1$ or $\varphi R2$; $\varphi R1 = \varphi R2$ $(=\varphi R0)$). The screw fastening process step can be carried out under the control by the control unit 18. Namely, the outputs by the torque detector 14 and the rotational angle sensor 16 are read by the control unit 18, and the driving state of the electric motor 12 is also controlled by the control unit 18. The output from the torque detector 14 (i.e., a torque value), or the output of the rotational angle sensor 16 (i.e., a rotational angle value) are read by the control unit 18, for example, at a short sampling cycle, to store the output values in the previously-discussed memory unit.

Figure 3A:
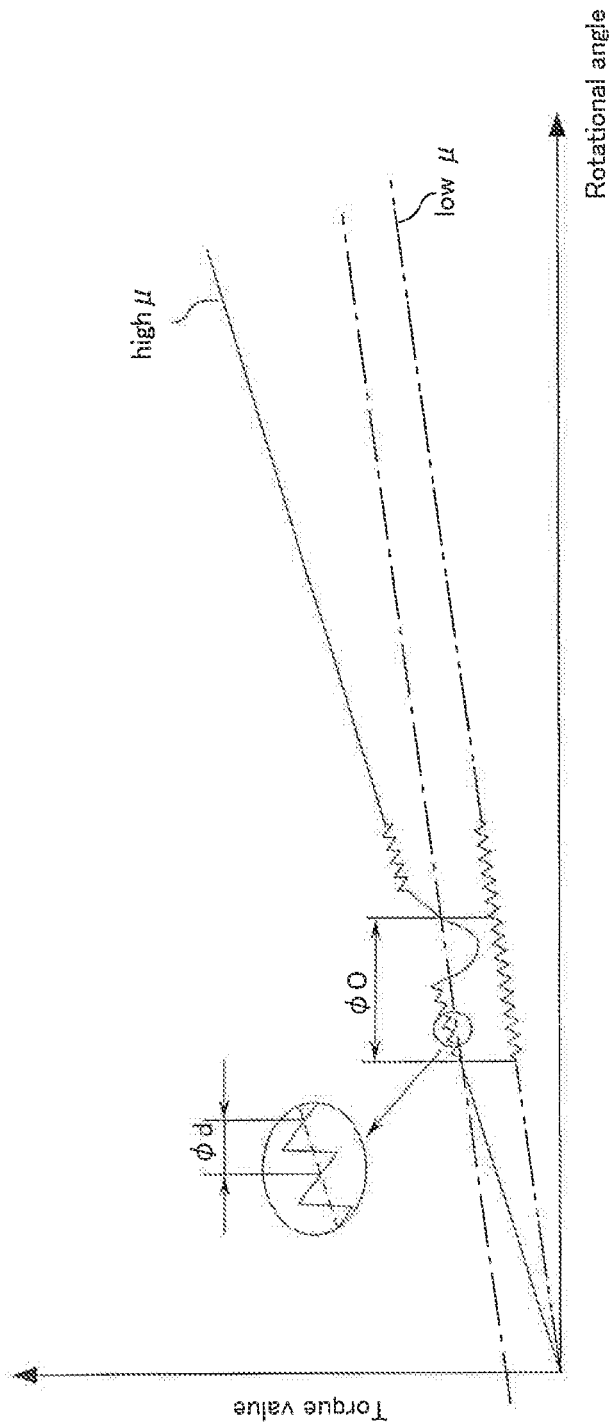

FIG. 3A is a partially schematic representation of an actually detected wave forms, which corresponds to the fastening torque—rotational angle property curve of FIG. 2A. The fluctuated wave parts in the drawing schematically illustrate noises added to the torque values. In the fastening torque—rotational angle property curve having a large friction coefficient (curve of high μ), the momentary large fluctuation (drop) shows a slip of the screw member. If the torque increase ratio (gradient) of a fastening torque—rotational angle property curve is calculated with the slip-based drop taken into consideration, the resultant curve (slip-considered curve) will be drawn as that with the alternate long and short dash line in the figure (in the drawings the slip is observed with a predetermined rotational angle φ0. Namely, the gradient of the curve with a large friction coefficient will be close to the fastening torque—rotational angle property curve having a small friction coefficient (low μ) shown with the alternate long and two short dashes line in the figure. Therefore, the theoretical seating point or the rotational angle of the screw member till the snug torque generation based on the slip-considered curve may be shifted from the proper (intended or effective) curve. As it is difficult to improve the axial tension accuracy of the screw member under slip occurrence, the screw fastening is to be suspended/stopped when a slip is detected in the course of the torque fastening detection.

Figure 3B:
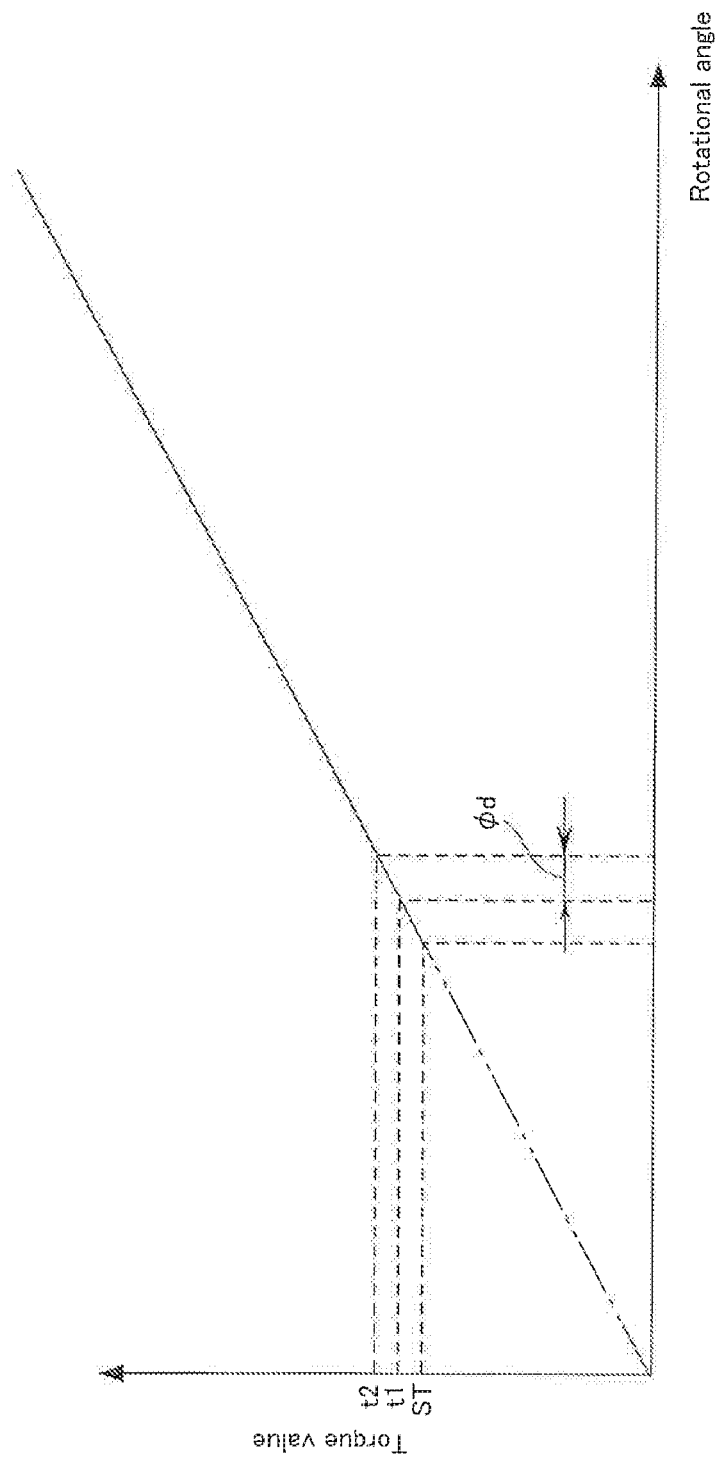

In FIG. 3A, a fluctuated wave part in the fastening torque—rotational angle property curve is circled, for describing a rotational angle φd to be explained in FIG. 3B FIG. 3B is a schematic diagram for illustrating how to detect a slip in the screw fastening procedure, which is as follows:

(a) a torque value difference Δt2–t1 is calculated for instance by subtracting a first torque value t1 from a second torque value t2 which is detected subsequently to the detection of the first torque value t1, wherein the torque values such as t1 and t2 may be measured at small intervals, e.g. at intervals of a constant rotational angle φd which corresponds to the cycle of a noise wave described in FIG. 3;

(b) the thus obtained torque value difference Δt2–t1 is divided with the rotational angle φd to obtain a gradient of the curve; and the above (a) and (b) are repeated many times (e.g. 10 times) for under the same settings to have many gradient samples to give a so-called moving average, whereby a slip occurrence is detected.

Hereinafter, "gradient" is defined as a value obtained by dividing a certain torque value difference (e.g. Δt2–1) with the corresponding rotational angle (e.g. φd). Since a predetermined constant value is used as the rotational angle φd, it is considered that the gradient substantially shows a torque value difference. When the rotational angle value such as φd to be in a slip detection corresponds to the above-mentioned fastening rotational angle φ0 explained in FIG. 2A, the value (gradient) obtained by dividing the torque value difference Δt2–t1 with the rotational angle φd will be the same as the torque increase ratio (gradient) explained in connection with the theoretical seating point determination (FIG. 2A).

Figure 4:
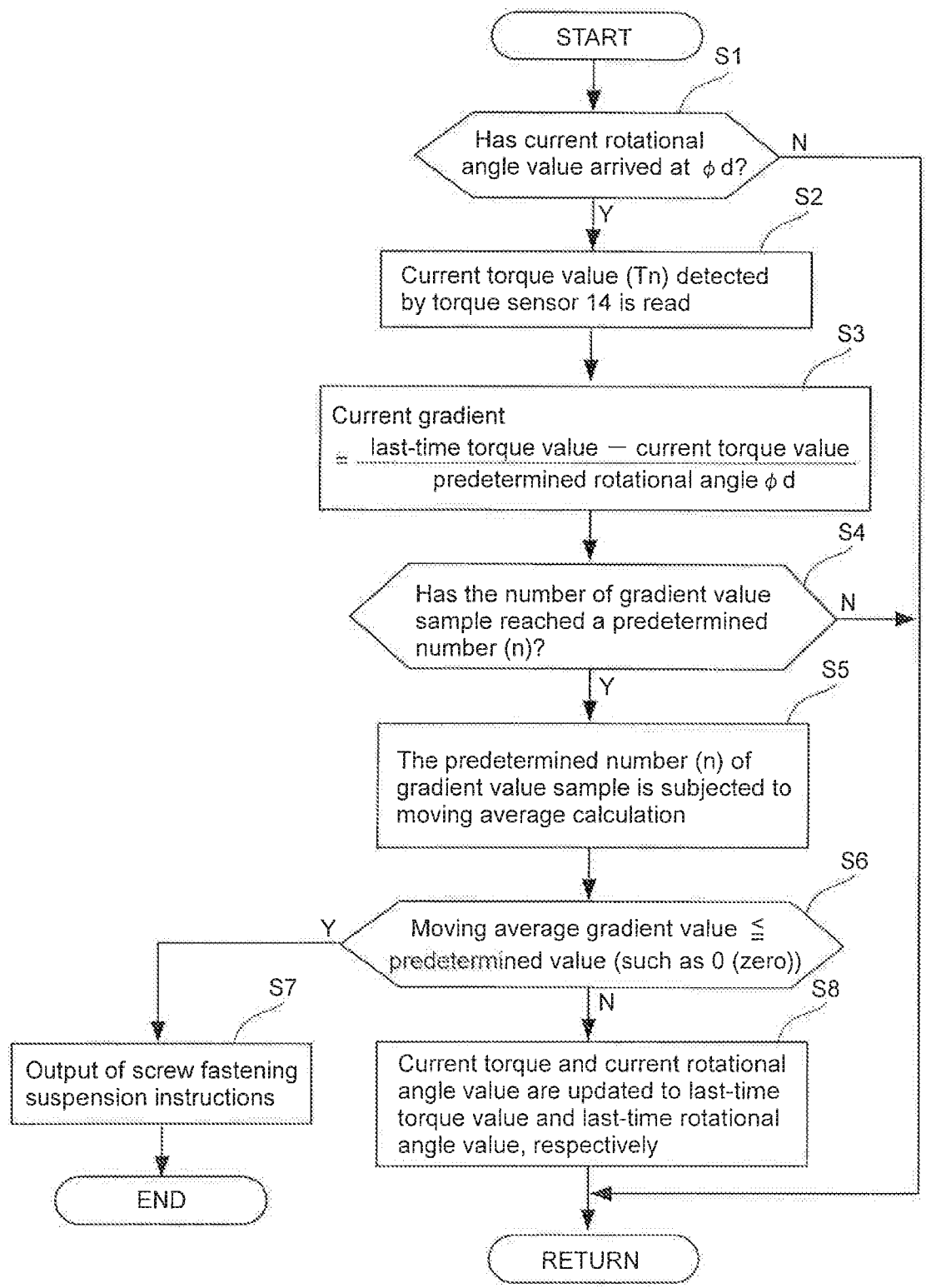
FIG. 4 is a flowchart for illustrating an example processing carried out in a processing unit to be used in the screw fastening apparatus explained with FIG. 1, FIGS. 5A to 5G are explanatory diagrams for illustrating at least one example result obtained from a processing explained with FIG. 4, FIGS. 6A to 6G are explanatory diagrams for illustrating at least one example result obtained from a processing explained with FIG. 4.

FIG. 4 is a flowchart for illustrating an arithmetic processing carried out in a processing unit 18, for detecting a slip of a screw member during a screw fastening procedure. The processing in the processing unit 18 is executed, for instance, with a timer interruption per a sampling cycle, after a predetermined snug torque value is detected.

In Step S1, the processing unit 18 evaluates whether or not an rotational angle, as an output values from the rotational angle sensor 16 (current rotational angle (φn (φ0 (zero)) arrives at a predetermined rotational angle φd. When current rotational angle value arrives at the rotational angle φd, Step S2 will be performed. If not, the procedure returns to Start. Among the previously detected rotational angles, the most recent rotational angle is referred to as a "last-time rotational angle".

In Step S2, a torque value currently detected by the torque sensor 14 is used as a current torque value (Tn). The current torque value is a value corresponding to the current rotational angle ((φn), which is obtained by adding the predetermined rotational angle φd to the last-time rotational angle (φn–1) (φn–1=φn–φd)).

Subsequently, in Step S3, a current gradient value is determined by subtracting the last-time torque value (Tn–1) which has been stored in the processing unit, from the current torque value (Tn) to obtain a latest torque value difference ($\Delta T_{latest}$), and the thus obtained latest torque value difference is divided with the predetermined rotation angle φd, to give a gradient (current gradient). The torque value difference is detected by the torque value difference detector 18a (FIG. 1).

In the following Step S4, it is determined whether the number of the stored gradient value (sample numbers) including the current gradient value, is reached to a predetermined number. If the number of the stored gradient values (previously determined gradient values (including the "last-time gradient value (kn–1)" measured right before the determination of current gradient value) reached to a predetermined number (n) (denominator for the evaluation, for example 10 gradients), the process step goes to Step S5. (Here, The "last-time gradient value (kn–1) is obtained based on the "last-time rotational angle" discussed in Step S2.) If the number of the stored gradients is less than the predetermined number (n), the process step will return to Start.

In Step S5, as at least one embodiment, the sum of the gradient values including the current gradient value (kn) and the previously determined gradient values (kn–1, kn–2, kn–3 . . . ) is divided by the predetermined number (n) subjected to moving average calculation by a moving average calculation unit which may be in the slip detector, continuously. It is possible to change the number (n) by the manual input performed by an operator.

Subsequently, in Step S6, the moving average gradient values successively obtained in Step S6 are evaluated, whether or not each of the moving average gradient values is on or below a predetermined value, such as 0 (zero). When the moving average is on or below the predetermined value, the process step goes to Step S7, while when the moving average is above the predetermined value, goes to Step S8.

In Step S7, screw fastening suspension instructions are output by the slip determination unit which may be in the slip detector, to discontinue the processing e.g. to the mechanical parts or electrical parts, as discussed previously.

On the other hand, in Step S8, current torque value Tn and the current rotational angle value φn are updated to the last-time torque value Tn–1 and the last-time rotational angle value φn–1, respectively, and returns to Start.

According to the processing above, the current gradient value kn is calculated at every rotational angle φd of a screw member and the thus obtained current gradient value (kn) is then stored as the "last-time gradient value (kn–1), in turn. By repeating this, last-time gradient value (kn–1) is continued to be to the previous gradient values (kn–2, kn–3 . . . ). After the number of the gradient values including the current gradient value (kn) and the previously determined gradient values (kn–1, kn–2, kn–3 . . . ) reaches a predetermined number (e.g., 10 gradients values), a moving average of the thus stored all gradients is obtained. When the moving average is obtained as a value 0 (zero) or less, it is so determined as a slip occurred to the screw member, and the screw fastening procedure is discontinued. Here, the slip detector 18b detects the slip from at least one average of the torque value differences, and outputs a slip detection signal to the screw fastening discontinuing unit 18c. As will be explained below, it is possible to minimize the effect of noise to the torque value difference (gradient) by use of the above-discussed moving average values.

Figure 5A:
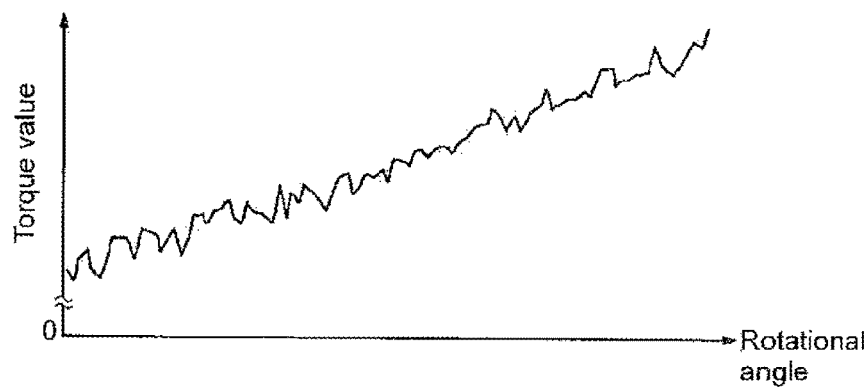
Figure 5B:
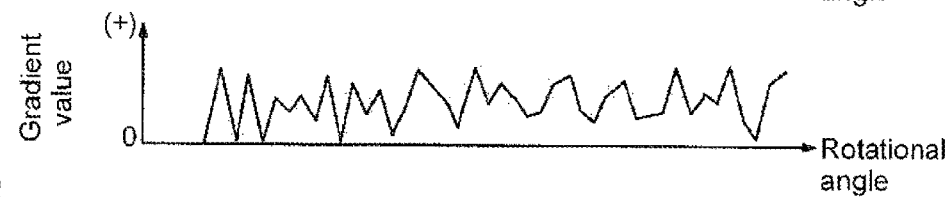
Figure 5C:
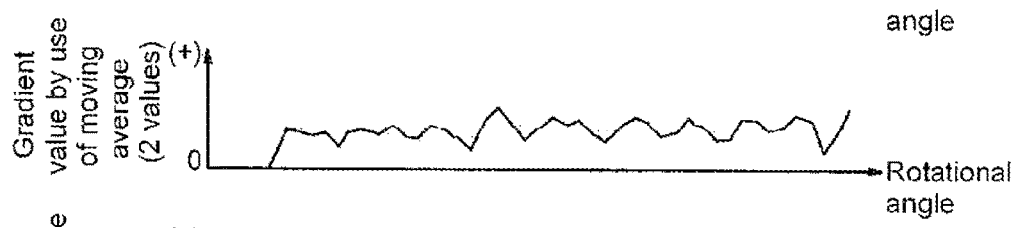
Figure 5D:
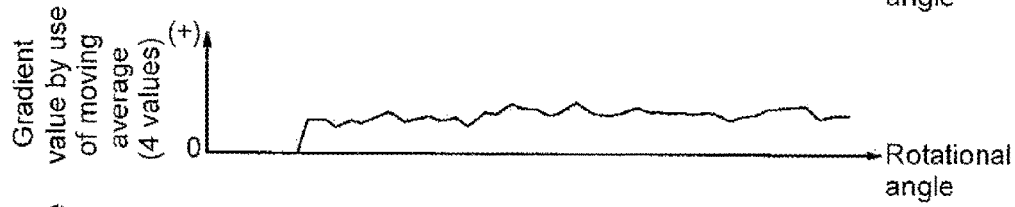
Figure 5E:
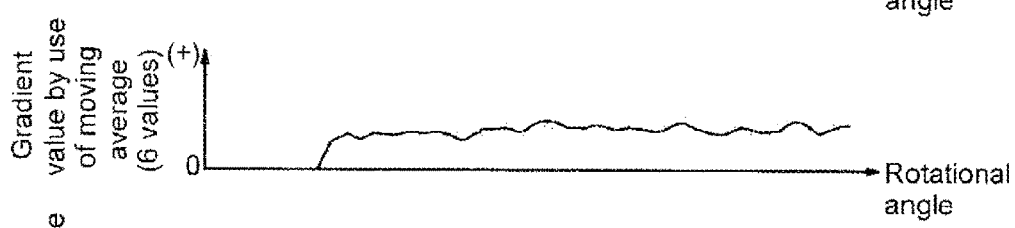
Figure 5F:
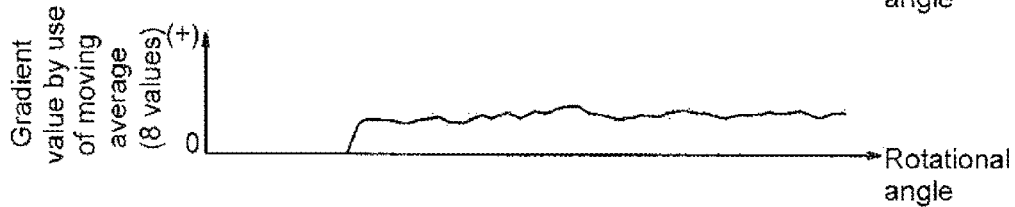
Figure 5G:
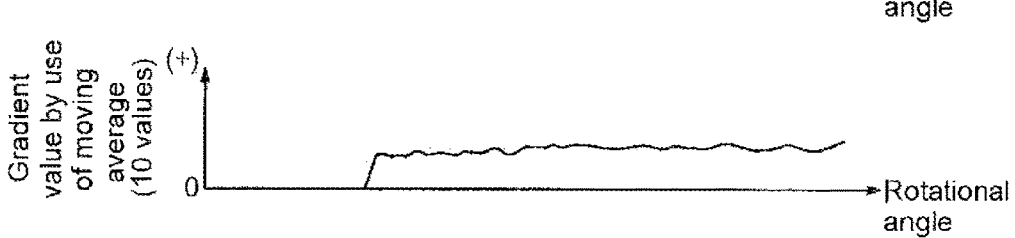

FIG. 5A is a graph of a fastening torque—rotational angle curve plotted with measured values, wherein no slips of the screw member are observed, but many of relatively large noises are included in the detected torque values. FIG. 5B is a graph for showing gradient values obtained from the detected torque values of FIG. 5A. In FIG. 5B, each of the gradient values are obtained based on a single torque value difference. In an example where the detected torque values are those with relatively large noises such as in FIG. 5A, such noise component(s) may be erroneously taken as a slip. This may happen especially when such an evaluation is made wherein a certain (acceptable) fluctuation range (e.g. upper limit) of the gradient value (threshold) is set, and it is assumed that a slip occurred by the detection of a gradient value which goes beyond the range (e.g. upper limit).

FIGS. 5C, 5D, 5E, 5F, and 5G are graphs which represent gradient curves obtained by use of moving average values. The moving averages in FIGS. 5C, 5D, 5E, 5F, and 5G were obtained by use of two gradient values of the most recent and the next most recent measurements (latest 2 measurements (moving average values measurement)), 4 gradient values of the latest 4 measurements, 6 gradient values of the latest 6 measurements, 8 gradient values of the latest 8 measurements, and 10 gradient values of the latest 10 measurement, respectively. As can be seen from those figures, the curve in FIG. 5C obtained by use of moving average of two gradient values fairly cancel noise components in the gradient values. The curve in FIG. 5G obtained by use of moving average of 10 gradient values well cancel noise components in the gradient values. In this way, the application of the moving averages to the gradient values will cancel the effect of noise in the gradient values, the noise being accompanied with the torque values used for obtaining the gradient values.

Figure 6A:
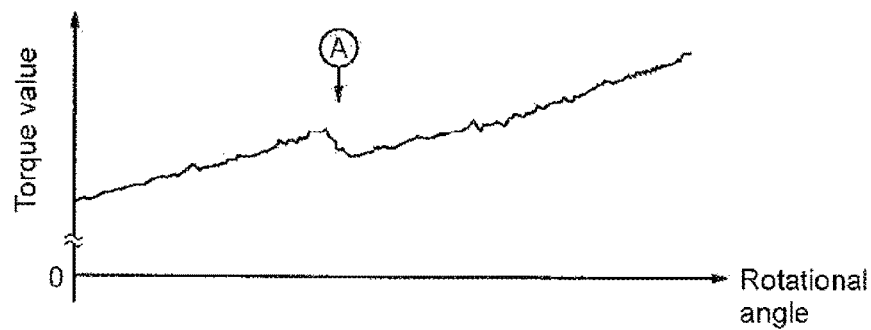
Figure 6B:
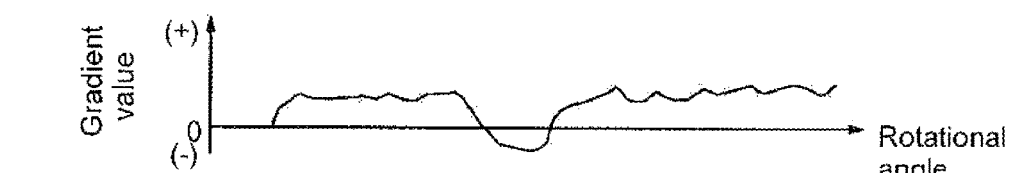
Figure 6C:
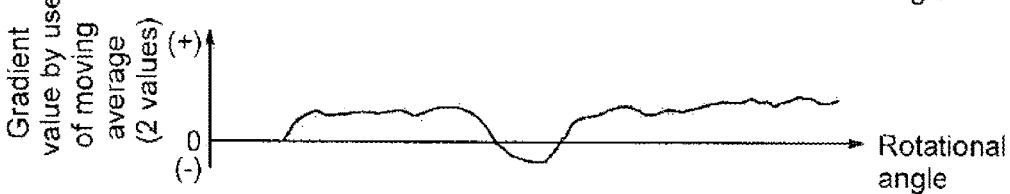
Figure 6D:
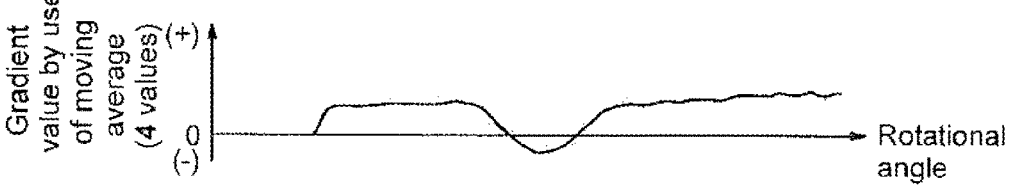
Figure 6E:
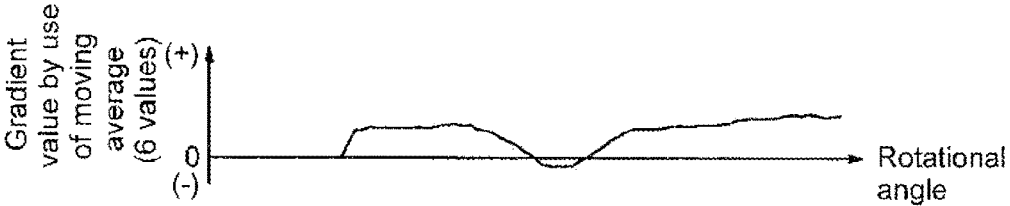

FIG. 6A is a graph of a fastening torque—rotational angle curve plotted with measured values, wherein no substantial noises are there, but a slip is detected at the rotational angle "A" in the figure. FIG. 6B is a graph for showing gradient values obtained from the detected torque values of FIG. 6A. In FIG. 6B, each of the gradient values are obtained based on a single torque value difference. In an example where the detected torque values are those with relatively small noises such as in FIG. 6A, the gradient values obtained based on the torque values have small fluctuations except for the occurrence of slip of a screw member at the rotational angle "A" such noise component(s) may be erroneously taken as a slip.

Figure 6F:
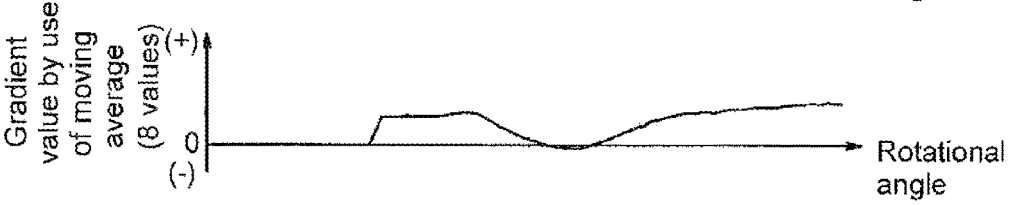
Figure 6G:
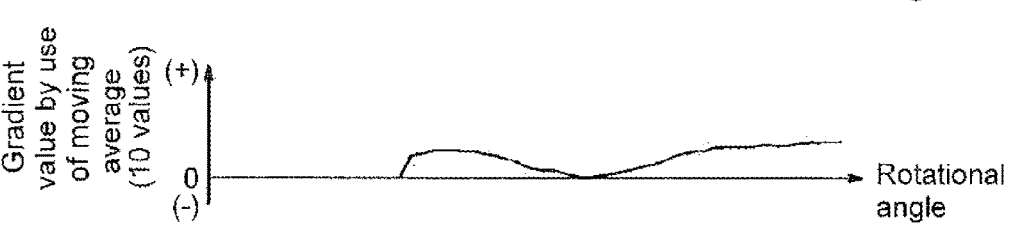

FIGS. 6C, 6D, 6E, 6F, and 6G are graphs which represent gradient curves obtained by use of moving average values. The moving averages in FIGS. 6C, 6D, 6E, 6F, and 6G were obtained by use of two gradient values of the most recent and the next most recent measurements (latest 2 measurements), 4 gradient values of the latest 4 measurements, 6 gradient values of the latest 6 measurements, 8 gradient values of the latest 8 measurements, and 10 gradient values of the latest 10 measurement, respectively. As can be seen from those figures, the fluctuation resulted from the slip in the gradient values (curve) tends to remain even after the noise in the detected torque value is cancelled by the application of moving averages. As stated in relation to Step S6 previously, it is possible to use a predetermined value (threshold value) such as 0 (zero) for determining the slip occurrence. By setting the threshold value of 0, even with the use of moving average of 8 gradient values as shown in FIG. 6F, it is possible to clearly observe a slip occurrence. When a slip is observed, the screw fastening procedure is discontinued. By such elimination, the axial tension accuracy of the screw member can be improved with the reliability and the productivity of the process being maintained.

In at least one embodiment, the number of gradient values to be used for a moving average (number of values) can arbitrarily be changed, as explained previously. The number of value is selected for cancelling noise in the gradient values in the detected noise value. On the other hand, the noise level in the detected torque value and will vary depending on factors such as materials, size, properties; conditions for screw fastening; circumstances therefor; and etc. It would be proper to determine and optimize the number of the values for cancelling the noise by an operator, depending the noise or noise generation circumstances. The number can be stored in the processing unit, for the optimization.

The gradient values (which substantially shows torque value difference so far as the rotational angle is a constant value) which include a slip of a screw member has a certain tendency, which is different from those affected by the noise contained detected torque values. After a slip of a screw member occurs, the torque values will be detected as series of lowered values. Therefore, for example, when gradient values are repeatedly indicated as negative values in the several continuous detections, it can be evaluated that a slip of a screw member has occurred. Here, the "negative value" of the gradient is that lower than the most recent one of the previously obtained gradients.

Figure 7:
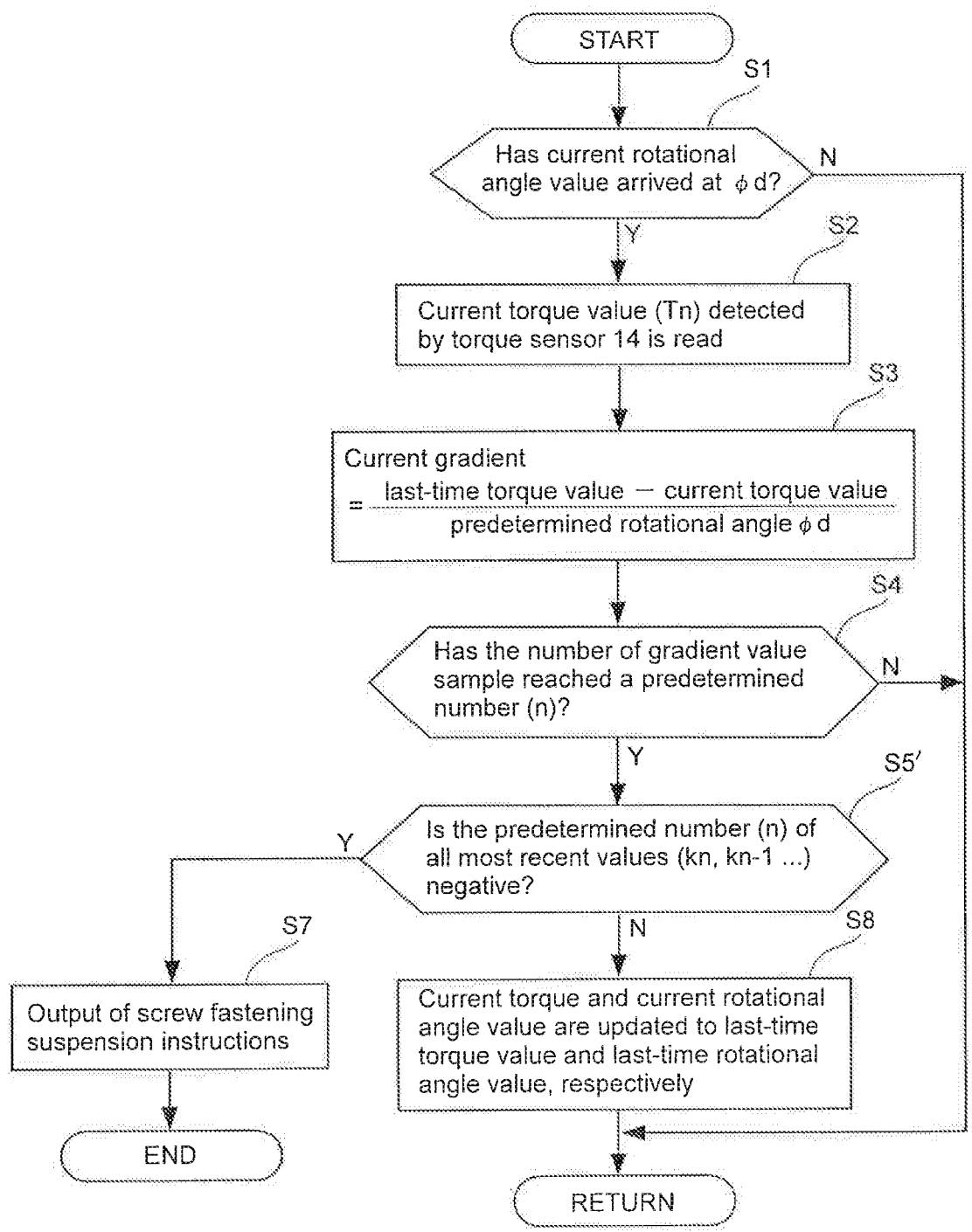
FIG. 7 is another flowchart for illustrating an example processing carried out in a processing unit to be used in the screw fastening apparatus explained with FIG. 1.

FIG. 7 is a flowchart for illustrating a processing for detecting a slip of a screw member. The processing is carried out in a similar way as in FIG. 4. More specifically, all process steps in FIG. 7 are identical with those in FIG. 4 except that Steps S5 and S6 in FIG. 4 are replaced with a single step S5' in FIG. 7.

In FIG. 7, in the same way as in the processing in FIG. 4, the processing is executed for instance with a timer interruption per a sampling cycle after the predetermined snug torque value is detected. In Step S5' in FIG. 7, the gradient values including the current gradient value (kn) and the previously determined gradient values (kn−1, kn−2, kn−3 . . . ) are evaluated whether or not each value (e.g. kn) is smaller (negative) compared to the most recent previous value (e.g. kn to compare with kn−1). When all most recent values (kn, kn−1 . . . ) are negative compared with the most recent previous values (kn−1, kn−2 . . . , respectively), the process step goes to Step S7. If not, the process step goes to Step S8.

In this processing, the screw fastening procedure is discontinued, for example, when the predetermined number, for instance 4 (four) of samples including the current gradient value (kn) and the previous gradient values (kn−1, kn−2, and kn−3) are all negative, considering that such 4 successive negative values indicates a slip occurrence. It is also possible to consider that a slip occurred when some values (e.g. 3) among the predetermined number (e.g. 4) are negative.

Noise-accompanied torque values go up and down at short intervals, where the up-down affected by the noise component can be seen around the torque values obtained as a result of actual fastening operation. On the other hand, the slip or stick-slip observed at the seating junction shows a torque loss (torque loss value). The torque loss is indicated as a few successive decreased torque values in the screw fastening operation. Accordingly, the predetermined number of the most recently measured negative values (successively measured values) can be evaluated as the indication of a slip of the screw member, as explained in the processing of FIG. 7. By suspending the screw fastening after the slip detection, the axial strength accuracy of the screw member can be improved without the reliability of the screw fastening and the productivity thereby being adversely affected.

As discussed above, by use of the screw fastening apparatus as an example:

a rotational angle at a screw fastening and the torque for the screw fastening are detected;

a theoretical seating point is obtained from the torque increased ratio based on the rotational angle;

gradient values of the fastening torque—rotational angle property curve are obtained for every predetermined rotational angle φ d from the theoretical seating point to the target rotational angle;

a slip of a screw member is detected from the predetermined number (n) of averaged gradient values; and the screw fastening operation is suspended when a slip is detected. Herein, the use of the averaged gradient values cancels the effect of noise to the torque values, and hence the detection of the gradient values which is on or less than a predetermined value (threshold value such as 0) is to be considered as a slip occurrence.

When a moving average value is used as the predetermined number (n) of averaged gradient values, the noise added to the torque values will be cancelled, whereby the averaged gradient value(s) obtained as the moving average, which is lower than the predetermined value (threshold value such as 0) is considered as the indication of a slip occurrence.

When the gradient values successively detected are all negative (lower than the previously determined respective gradient value) predetermined number of times, it is possible judge that a slip occurred. In other words, the slip detector 18b or a slip determination unit therein determines that a slip of the screw member has occurred, after successively detecting torque value differences, which are lowered.

The number of the gradient value (sample numbers) to be used for detecting the slip of the screw member can be appropriately chosen, so far as the noise added to the detected torque value can be cancelled, depending on the factors such as materials, size, properties; conditions for screw fastening; circumstances therefor; and etc. Accordingly, the axial tension accuracy and the slip detection accuracy will be improved.

It should be appreciated that modifications and alterations of the novel method and apparatus described herein may be made. It should be also appreciated that various omissions, replacements, and modifications may be made in the method and the apparatus described herein, without departing from the scope of the spirit of the technology. The technology is intended to include such modifications and alterations in so far as they fall within the scope of the appended claims or the equivalents thereof.

The invention claimed is:

1. A screw fastening apparatus for fastening a screw member having a bearing surface with respect to a member to be fastened by rotating the screw member from a theoretical seating point to a target rotational angle, comprising:

a rotational angle sensor which senses rotational angle values of the screw member for fastening the screw member;

a torque detector which detects torque values for fastening the screw member, the theoretical seating point being obtained by extrapolating a torque increased ratio, which is a quotient obtained by dividing a torque value difference between a first torque value and a second torque value by a predetermined unit rotational angle;

a torque value difference detector which detects a number of torque value differences, each of the torque value differences being a difference of the torque values detected at intervals of a constant rotational angle;

a slip detector which detects a slip of the screw member with respect to the member to be fastened, from an average of the torque value differences; and a screw fastening discontinuing unit which instructs to discontinue the screw fastening when the slip is detected by the slip detector.

2. The screw fastening apparatus as claimed in claim 1, wherein the slip detector comprises:

a moving average calculation unit which calculates a moving average value of the plurality of torque value differences; and a slip determination unit which determines that a slip of the screw member has occurred, when the moving average value calculated by the moving average calculation unit is on or below a predetermined threshold value.

3. The screw fastening apparatus as claimed in claim 2, wherein the slip determination unit determines that a slip of the screw member has occurred, after the torque value differences, which are successively detected by the torque value difference detector, are continuously lowered.

4. The screw fastening apparatus as claimed in claim 2, wherein the number of the plurality of torque value differences used for obtaining the moving average thereof by the moving average calculation unit is variable.

5. The screw fastening apparatus as claimed in claim 1, further comprising a control unit, the control unit comprising therein the torque value difference detector, the slip detector, and the screw fastening discontinuing unit.

6. The screw fastening apparatus as claimed in claim 5, wherein the control unit further comprises a central processing unit (CPU) and a memory unit connected to the central processing unit, the memory unit storing the torque values detected by the torque detector, and outputting the detected torque values to the torque value difference detector.

7. The screw fastening apparatus as claimed in claim 1, wherein the slip detector determines that a slip of the screw member has occurred, after the torque value differences, which are successively detected by the torque value difference detector, are continuously lowered.

8. The screw fastening apparatus as claimed in claim 1, wherein the number of the plurality of torque value differences used for obtaining the average thereof by the slip detector is variable.

9. A screw fastening apparatus for fastening a screw member having a bearing surface with respect to a member to be fastened by rotating the screw member from a theoretical seating point to a target rotational angle, comprising:

a rotational angle sensor configured to detect rotational angle of the screw member for fastening the screw member;

a torque detector configured to detect torque values for fastening the screw member; and a processor configured to:

obtain the theoretical seating point by extrapolating a torque increased ratio, which is a quotient obtained by dividing a torque value difference between a first torque value and a second torque value by a predetermined unit rotational angle of the screw member;

detect a number of torque value differences, each of the torque value differences is a difference of the torque values detected at intervals of a constant rotational angle of the screw member;

detect a slip of the screw member, with respect to the member to be fastened, from an average of the torque value differences; and instruct to discontinue the screw fastening when the slip is detected.

10. A screw fastening method for fastening a screw member having a bearing surface with respect to a member to be fastened by rotating the screw member from a theoretical seating point to a target rotational angle, the method comprising:

sensing rotational angle values of the screw member for fastening the screw member by a rotational angle sensor;

detecting torque values for fastening the screw member by a torque detector;

obtaining the theoretical seating point being obtained by extrapolating a torque increased ratio, which is a quotient obtained by dividing a torque value difference between a first torque value and a second torque value by a predetermined unit rotational angle;

detecting a number of torque value differences by a torque value difference detector, each of the torque value differences is a difference of the torque values detected at intervals of a constant rotational angle;

detecting a slip of the screw member with respect to the member to be fastened by a slip detector, from an average of the torque value differences; and instructing to discontinue the screw fastening by a screw fastening discontinuing unit when the slip is detected by the slip detector.

11. The screw fastening method as claimed in claim 10, wherein the slip detector comprises:

a moving average calculation unit which calculates a moving average value of the plurality of torque value differences; and a slip determination unit which determines that a slip of the screw member has occurred, when the moving average value calculated by the moving average calculation unit is on or below a predetermined threshold value.

12. The screw fastening apparatus as claimed in claim 11, wherein the slip determination unit determines that a slip of the screw member has occurred, after the torque value differences, which are successively detected by the torque value difference detector, are continuously lowered.

13. The screw fastening method as claimed in claim 11, wherein the number of the plurality of torque value differences used for obtaining the moving average thereof by the moving average calculation unit is variable.

14. The screw fastening method as claimed in claim 10, further comprising a control unit, the control unit comprising therein the torque value difference detector, the slip detector, and the screw fastening discontinuing unit.

15. The screw fastening method as claimed in claim 14, wherein the control unit further comprises a central processing unit (CPU) and a memory unit connected to the central processing unit, the memory unit storing the torque values detected by the torque detector, and outputting the detected torque values to the torque value difference detector.

16. The screw fastening method as claimed in claim 10, wherein the slip detector determines that a slip of the screw member has occurred, after the torque value differences, which are successively detected by the torque value difference detector, are continuously lowered.

17. The screw fastening method as claimed in claim 10, wherein the number of the plurality of torque value differences used for obtaining the average thereof by the slip detector is variable.

* * * * *